(12) United States Patent
Chakhaiyar (10) Patent No.: US 9,721,122 B2
(45) Date of Patent: Aug. 1, 2017

(54) METHOD AND SYSTEM FOR PERFORMING SECURE I/O OPERATION IN A PLUGGABLE FLASH STORAGE DEVICE

(71) Applicant: Madhukar Gunjan Chakhaiyar, Gaya (IN)

(72) Inventor: Madhukar Gunjan Chakhaiyar, Gaya (IN)

(73) Assignee: WIPRO LIMITED, Bangalore (IN)

( * ) Notice: Subject to any disclaimer, the term of this patent is extended or adjusted under 35 U.S.C. 154(b) by 33 days.

(21) Appl. No.: 14/664,005

(22) Filed: Mar. 20, 2015

(65) Prior Publication Data

US 2016/0232383 A1    Aug. 11, 2016

(30) Foreign Application Priority Data

Feb. 5, 2015    (IN) .............................. 582/CHE/2015

(51) Int. Cl.
*G06F 21/00* (2013.01)
*G06F 21/85* (2013.01)
*G06F 3/06* (2006.01)
*G06F 21/44* (2013.01)
*G06F 21/79* (2013.01)
(Continued)

(52) U.S. Cl.
CPC ............ *G06F 21/85* (2013.01); *G06F 3/0622* (2013.01); *G06F 3/0637* (2013.01); *G06F 3/0638* (2013.01); *G06F 3/0679* (2013.01); *G06F 12/0246* (2013.01); *G06F 21/445* (2013.01); *G06F 21/79* (2013.01); *G06F 21/31* (2013.01); *G06F 2212/7209* (2013.01)

(58) Field of Classification Search
CPC ...... G06F 21/00; G06F 12/0246; G06F 21/31; G06F 21/445; G06F 21/85; G06F 3/0622
USPC ........................................................ 713/193
See application file for complete search history.

(56) References Cited

U.S. PATENT DOCUMENTS

2016/0179711 A1* 6/2016 Oikarinen ............... G06F 3/061
                                                                710/40

OTHER PUBLICATIONS

A. N. Magdum et al., "A Secure Data Transfer Algorithm for USB Mass Storage Devices to Protect Documents", *International Journal of Emerging Engineering Research and Technology*, vol. 2, No. 4, Jul. 31, 2014, pp. 78-84.

(Continued)

*Primary Examiner* — Syed Zaidi
(74) *Attorney, Agent, or Firm* — Finnegan, Henderson, Farabow, Garrett & Dunner LLP (57) ABSTRACT

The present disclosure relates to a method and a system for performing secure read/write operations in the pluggable flash storage device. In one embodiment, a request for at least writing and reading of data in/from the pluggable flash storage device is received. Upon receiving the request for writing data, the storage device is authenticated based on a predetermined signature of the pluggable flash storage device. Upon authenticating the storage device, the at least one of user and the storage controller who made the request is also authenticated and write operation is performed based on successful authentication of the at least one of the user and the storage controller. By way of establishing secure communication between the storage device and the user or the storage controller during the read/write operation the hacking of the data in the storage device or use of the storage device with wrong intent is avoided.

21 Claims, 5 Drawing Sheets

(51) Int. Cl.
  *G06F 12/02* (2006.01)
  *G06F 21/31* (2013.01)

(56) References Cited

OTHER PUBLICATIONS

Bo Chen et al., "A Secure Access Authentication Scheme for Removable Storage Media", *Journal of Information and Computational Science*, vol. 9, No. 15, Nov. 30, 2012, pp. 4353-4363.
European Search Report issued May 17, 2016 in European Patent Office in counterpart European Patent No. Application 15192058.4, 9 pages.

\* cited by examiner

METHOD AND SYSTEM FOR PERFORMING SECURE I/O OPERATION IN A PLUGGABLE FLASH STORAGE DEVICE

PRIORITY CLAIM

This U.S. patent application claims priority under 35 U.S.C. §119 to: India Application No. 582/CHE/2015, filed on Feb. 5, 2015. The aforementioned application is incorporated herein by reference in its entirety.

FIELD OF THE DISCLOSURE

The present subject matter is related, in general to data security, and more particularly, but not exclusively to method and system for preforming secure read/write operation in a pluggable flash storage device.

BACKGROUND

Generally protection of data stored in a pluggable flash storage device is of growing importance. The pluggable flash storage device consists of flash memory data storage device integrated with a Universal Serial Bus (USB) which is typically removable and rewriteable. The pluggable flash storage device is generally used for persistent cache offload for storage area network (SAN) controllers in SAN array. In cases when the storage controller restarts or losses power, the storage controller immediately flushes the cached data to the pluggable flash storage device. In addition, the pluggable flash storage device also stores data like metadata, code images, diagnostic data such as core files and log files, and extended diagnostics associated with the storage controller.

Figure 1:
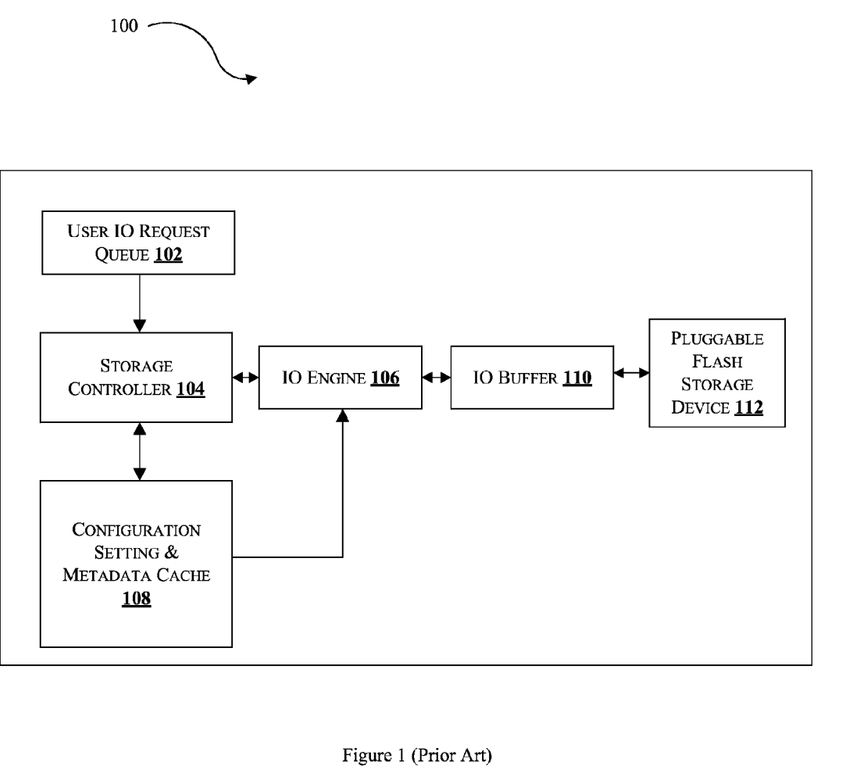
FIG. 1 illustrates a block diagram of a conventional system for preforming read/write operation in a pluggable flash storage device.

FIG. 1 illustrates a conventional SAN array 100 comprising storage controller, pluggable flash storage device and related modules.

The SAN array 100 (alternatively referred to as system 100) comprises a User IO request queue 102, storage controller 104, IO Engine 106, configuration setting and metadata cache 108, IO buffer 110 and pluggable flash storage device 112 (interchangeably referred to as storage device 112). The system 100 receives a request for read/write operation from/in the storage device 112. The request is made by the user or by the storage controller 104. The user IO request queue 102 receives and stores the request in the order of receipt and forwards the request to the storage controller 104 for further processing.

The storage controller 104 receives the request from the user IO request queue 102 and instructs the IO engine 106 to perform the requested read/write operation from/to the storage device 112. In case of write operation, the IO buffer 110 buffers the data to be written into the storage device 112 and the IO engine 106 retrieves the buffered data from the IO buffer 110 before writing the data. In case the storage controller 104 restarts or loses power and if the user or the storage controller 104 had searched for configuration and metadata including controller firmware image with configuration setting, Metadata, Diagnostic data such as core files and log files, and extended diagnostics of storage controller stored at configuration setting & metadata cache 108, then the storage controller 104 instructs the IO engine 106 to flush the data of configuration setting & metadata cache 108 to the storage device 112.

If the storage device 112 is plugged into the system 100 after the storage controller 104 restarts, the storage controller 104 searches for data of configuration setting & metadata in the configuration setting & metadata cache 108 and extracts the required data from the storage device 112. The storage controller 104 also extracts any other required data provided by the user to set or modify the system 100. After extracting the required data from the storage device 112, the extracted data is stored into the configuration setting & metadata cache 108 and the storage controller 104 is reconfigured based on the stored data. Once the reconfiguration is complete, the storage controller 104 resumes its operation. However, in case of unauthorized user access made to the storage device 112 bad data or malware or virus could be inserted to the storage device 112. Further, in case hacking of the storage device 112 is done by unauthorized user, then the stored data may be damaged. In both cases, the result would be catastrophic and the storage controller 104 would start malfunctioning, or undergo crash or could hang up.

Therefore, there is a need for a method and system to establish a secure communication during read/write operation, to restore session in case of it being interrupted during the session and to provide secured access to the storage device, overcoming the above mentioned limitations.

SUMMARY

One or more shortcomings of the prior art are overcome and additional advantages are provided through the present disclosure. Additional features and advantages are realized through the techniques of the present disclosure. Other embodiments and aspects of the disclosure are described in detail herein and are considered a part of the claimed disclosure.

Accordingly, the present disclosure relates to a method of preforming secure read/write operation in a pluggable flash storage device. The method comprises the step of receiving one or more requests for at least writing and reading of data in/from the pluggable flash storage device. Upon receiving the request for writing data, the storage device is authenticated based on a predetermined signature of the pluggable flash storage device. Upon authenticating the storage device, the method performs authentication of at least one of user and the storage controller who made the request by comparing a write access key provided to at least one of user and the storage controller with a predetermined write access key. On authenticating the pluggable flash storage device and at least one of the user and the storage controller, the method perform write operation of data in the pluggable flash storage device.

Further, the present disclosure relates to a system for preforming secure read/write operation in a pluggable flash storage device. The system comprises a user IO request queue for receiving one or more requests for at least one of reading and writing of data from at least one of user and a storage controller. The system further comprises the pluggable flash storage device, an IO engine coupled with the pluggable flash storage device and the storage controller coupled with the user IO request queue and the IO engine. The storage controller comprises at least a device authentication and data security (DADS) component configured to receive, from the user IO request queue, the one or more requests for writing data. Upon receiving the request, the DADS component authenticates the pluggable flash storage device based on a predetermined signature of the pluggable flash storage device and also authenticates at least one of user and the storage controller by comparing a write access key provided to at least one of user and the storage controller with a predetermined write access key. Upon authenticating the pluggable flash storage device and at least one of the user and the storage controller, the DADS component performs write operation of data in the pluggable flash storage device.

Furthermore, the present disclosure relates to a non-transitory computer readable medium including instructions stored thereon that when processed by at least one processor cause a system to perform the act of receiving one or more request for at least one of writing and reading of data in/from the pluggable flash storage device. Further, the instructions cause the processor to authenticate the pluggable flash storage device based on a predetermined signature of the pluggable flash storage device and also authenticate at least one of user and the storage controller by comparing a write access key provided to at least one of user and the storage controller with a predetermined write access key. Upon authenticating the pluggable flash storage device and at least one of the user and the storage controller, the processor is further configured to perform write operation of data in the pluggable flash storage device.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the spirit and the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or apparatus.

The present disclosure relates to a method and a system for performing secure read/write operations in the pluggable flash storage device. In one embodiment, a request for at least writing and reading of data in/from the pluggable flash storage device is received. Upon receiving the request for writing data, the storage device is authenticated based on a predetermined signature of the pluggable flash storage device. Upon authenticating the storage device, the at least one of user and the storage controller who made the request is also authenticated and write operation is performed based on successful authentication of the at least one of the user and the storage controller. By way of establishing secure communication between the storage device and the user or the storage controller during the read/write operation the hacking of the data in the storage device or use of the storage device with wrong intent is avoided.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

Figure 2:
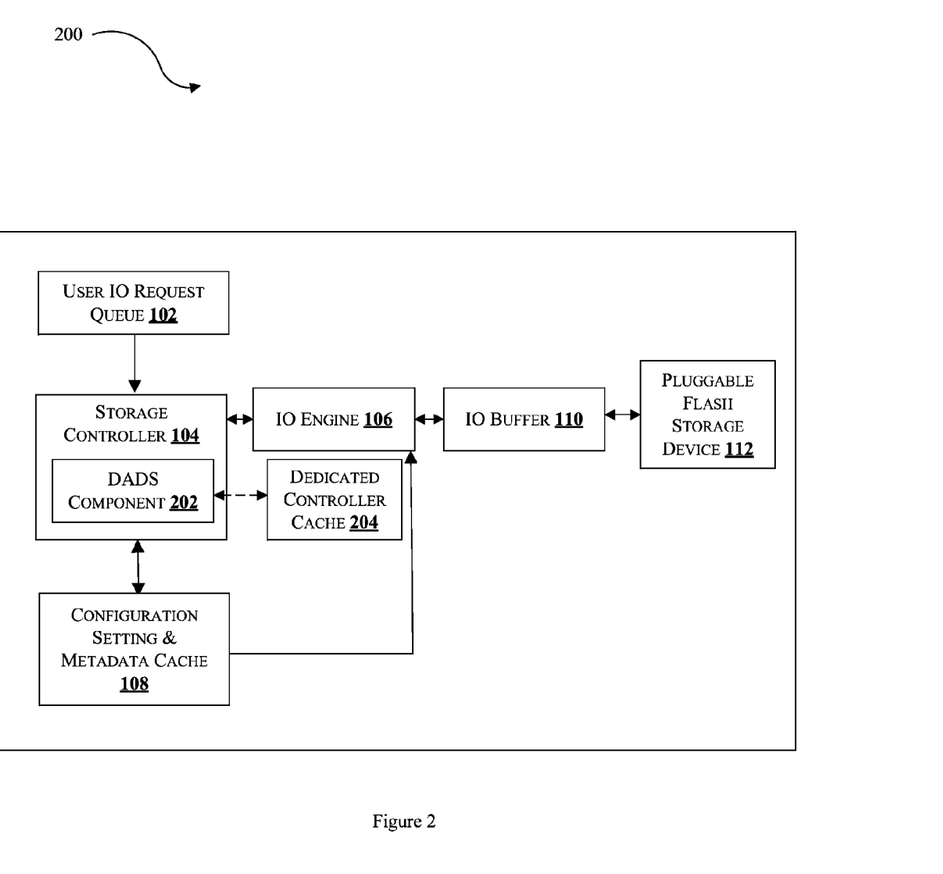
FIG. 2 illustrates a block diagram of an exemplary system for preforming read/write operation in a pluggable flash storage device in accordance with some embodiments of the present disclosure.
Figure 3A:
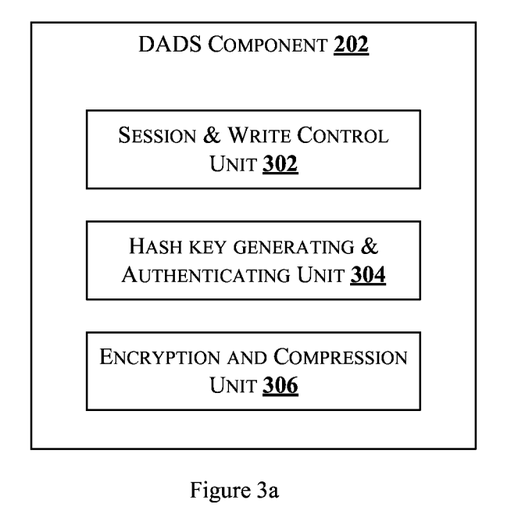
FIGS. 3a and 3b illustrate block diagram of DADS component and dedicated controller cache respectively in accordance with some embodiments of the present disclosure.

FIG. 2 illustrates a block diagram of an exemplary system for preforming read/write operation in a pluggable flash storage device in accordance with some embodiments of the present disclosure;

As illustrated, the system 200 comprises the user IO request queue 102, the storage controller 104, the IO Engine 106, the configuration setting and metadata cache 108, the IO buffer 110 and the storage device 112. The system 200 further comprises a Device Authentication and Data Security (DADS) component 202 and a dedicated controller cache 204 coupled with the DADS component 202. In one embodiment, the DADS component 202 may be implemented within the storage controller 104. In another embodiment, the DADS component 202 may be externally coupled with the storage controller 104. The DADS component 202 comprises one or more components for authenticating the user or the storage controller making the request for read/write operation and managing one or more sessions for performing read/write operation. As illustrated in FIG. 3*a*, the DADS component 202 comprise a session & write control (SWCU) unit 302, a hash key generating and authenticating unit (HKGAU) 304 and an encryption and compression unit (ECU) 306.

Figure 3B:
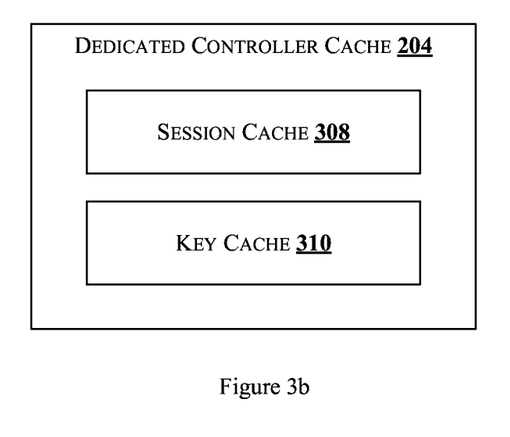

The SWCU 302 is configured to control and manage one or more session between the storage controller 104 or the user and the storage device 112. On receiving a request for write operation by the storage controller 104, the SWCU 302 establishes a session between the requested user or the storage controller 104 and the storage device 112, generates a unique session ID and assigns the unique session ID to the established session. The SWCU 302 stores the session ID in the dedicated controller cache 204. In one embodiment, the dedicated controller cache 204, as illustrated in FIG. 3*b*, comprises a session cache 308 and a key cache 310. The SWCU 302 stores the session ID in the session cache 308 for future use. For example, if the session is terminated during the operation, the SWCU 302 reestablishes the terminated session based on the last session ID stored in the session cache 308. The SWCU 302 also prevents overwriting of the storage device 112 by another session running simultaneously. If any last session ID is available, then the SWCU 302 allows writing operation of the unfinished data of the last session before establishing a new session. The SWCU 302 continuously monitors the one or more sessions that are in progress and maintains at least one session between the storage device 112 and the user or the storage controller 104.

The SWCU 302 is further configured to control write operations requested by the user or the storage controller 104. In one embodiment, the SWCU 302 generates and provides a unique write access key to at least one of the user and the storage controller 104 and authenticates the user or the storage controller 104 based on the write access key provided. In one implementation, the SWCU 302 generates the unique write access key and stores the generated access key in the key cache 310 of the dedicated controller cache 204. Once the session is established, the SWCU 302 compares the write access key provided by the user with the predetermined access key stored in the key cache 310 for the respective user or the storage controller 104. If the comparison is successful, the SWCU 302 performs the write operation of the data into the storage device 112, otherwise the write operation is not performed.

The HKGAU 304 is configured to authenticate the storage device 112 before performing the write operation. In one embodiment, the HKGAU 304 initially generates a unique signature for the storage device 112 and authenticates the storage device 112 based on the previously determined signature. In one implementation, HKGAU 304 initially generates a unique signature for the storage device 112 based on information associated with the storage device 112. For example, the information includes at least physical serial number, model number, manufacturing identity number and name of manufacturer. The HKGAU 304 generates a pseudo number based on the information associated with the storage controller 104 and stores the generated pseudo number in the dedicated controller cache 204. The pseudo number thus generated is also stored in a predefined non-volatile memory location of the storage device 112. Upon generating the pseudo number, the HKGAU 304 processes the pseudo number and generates a hashed value of the pseudo number.

Further, the ECU 306 encrypts the hashed value into a signature and creates a predetermined signature for the storage device 112. The signature thus created is stored in a predefined non-volatile memory location of the storage device 112. The ECU 306 also encrypts the data to be stored in the storage device 112 using known encryption techniques. Further, the ECU 306 compresses the encrypted data using known compression techniques before storing in the storage device 112. Thus the encryption and compression of the data ensures secured access of the data by preventing unauthorized access by user who is unaware of the encryption and compression techniques applied on the data.

Before performing the write operation, the HKGAU 304 verifies the signature of the storage device 112 stored in the predefined non-volatile memory location of the storage device 112. For example, the HKGAU 304 retrieves the stored signature from the pre-defined memory location and the ECU 306 performs decryption and hashing on the signature to generate a pseudo number. Upon generating the pseudo number, the HKGAU 304 compares the generated pseudo number with a predetermined pseudo number stored in the predefined memory location of the dedicated controller cache 204. Upon successful comparison, the HKGAU 304 generates a signal indicating the authenticity of the storage device 112.

Upon authenticating the storage device 112 and the user or the storage controller 104, the system 200 performs writing operation of data into the storage device 112. In one embodiment, the ECU 306 encrypts the data to be written into the storage device 112 using known encryption techniques. Further, the ECU 306 compresses the encrypted data using known compression techniques. The compressed data is then stored in a predefined memory location in the storage device 112.

When read operation is performed on the data stored in the storage device 112, the ECU 306 performs decompression and decryption of data. The ECU 306 extracts the compressed data from the storage device 112, performs decompression of the extracted data using known decompression techniques and decrypts the decompressed data using known decryption techniques to retrieve the raw data.

The dedicated controller cache 204 stores the information associated with the storage device 112, the pseudo number, the last session ID and predetermined write/read access key.

Figure 4:
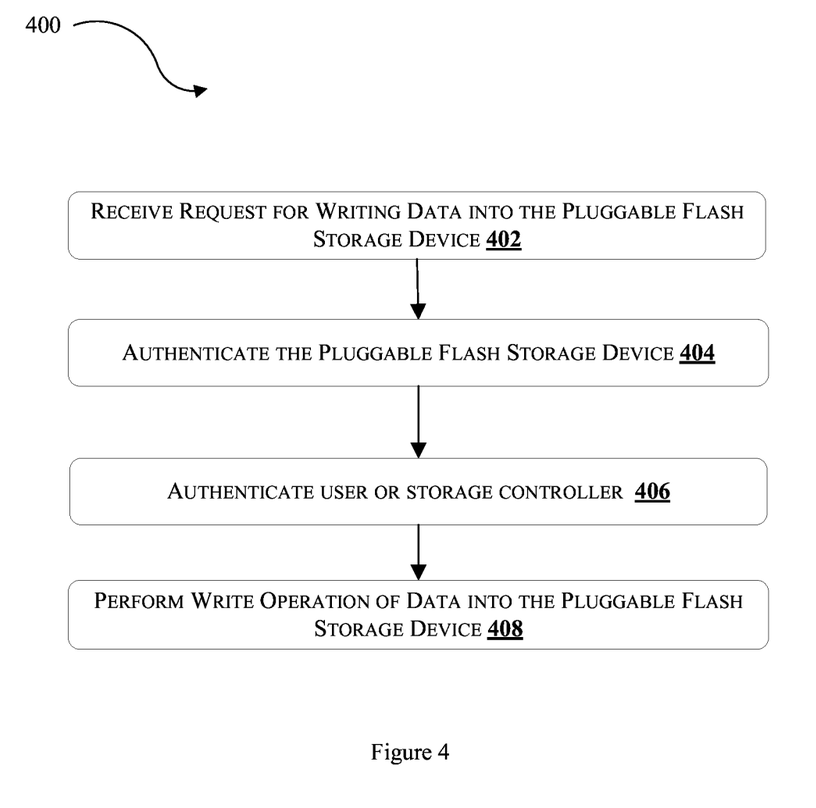
FIG. 4 illustrates a flowchart of an exemplary method of performing write operation into the pluggable flash storage device in accordance with some embodiments of the present disclosure.

FIG. 4 illustrates a flowchart of an exemplary method of performing write operation into the pluggable flash storage device in accordance with some embodiments of the present disclosure;

As illustrated in FIG. 4, the method 400 comprises one or more blocks implemented by the system 200 for performing secure write operation in the storage device 112. The method 400 may be described in the general context of computer executable instructions. Generally, computer executable instructions can include routines, programs, objects, components, data structures, procedures, modules, and functions, which perform particular functions or implement particular abstract data types.

The order in which the method 400 is described is not intended to be construed as a limitation, and any number of the described method blocks can be combined in any order to implement the method 400. Additionally, individual blocks may be deleted from the method 400 without departing from the spirit and scope of the subject matter described herein. Furthermore, the method 400 can be implemented in any suitable hardware, software, firmware, or combination thereof.

At block 402, receive request for writing data into the storage device. In one embodiment, a request for writing data is received by the user IO request queue 102. The user IO request queue 102 forwards the request to the storage controller 104. The data to be written may include metadata, code images, diagnostic data such as core files and log files, and extended diagnostics associated with the storage controller 104.

At block 404, authenticate the storage device. In one embodiment, the HKGAU 304 authenticates the storage device 112 before performing the write operation. The HKGAU 304 verifies the signature of the storage device 112 stored in the predefined non-volatile memory location of the storage device 112. In one embodiment, the HKGAU 304 initially generates a unique signature for the storage device 112 based on information associated with the storage device 112. For example, the information may include at least physical serial number, model number, manufacturing identity number and name of manufacturer. The HKGAU 304 generates a pseudo number based on the information associated with the storage controller 104 and stores the generated pseudo number in the dedicated controller cache 204. Upon generating the pseudo number, the HKGAU 304 processes the pseudo number and generates a hashed value of the pseudo number. The pseudo number thus generated is stored in a predefined non-volatile memory location of the storage device 112. The signature thus created is stored in a predefined non-volatile memory location of the storage device 112. Further, the ECU 306 encrypts the hashed value into a signature and creates a predetermined signature for the storage device 112. The ECU 306 also encrypts and compresses the data to be stored in the storage device 112 using known encryption and compression techniques.

Upon receiving the request for write operation, the HKGAU 304 verifies the signature of the storage device 112 stored in the predefined non-volatile memory location of the storage device 112. For example, the HKGAU 304 retrieves the stored signature from the pre-defined memory location and the ECU 306 performs decryption and hashing on the signature to generate a pseudo number. Upon generating the pseudo number, the HKGAU 304 compares the generated pseudo number with a predetermined pseudo number stored in the predefined memory location of the dedicated controller cache 204. Upon successful comparison, the HKGAU 304 generates a signal indicating the authenticity of the storage device 112.

At block 406, authenticate user or the storage controller. In one embodiment, the SWCU 302 establishes a session between the user or the storage controller 104 and the storage device 112. On receiving a request for write operation by the storage controller 104, the SWCU 302 opens a session between the requested user or the storage controller 104 and the storage device 112, generates a unique session ID and assigns the unique session ID to the opened session. The SWCU 302 stores the session ID in the dedicated controller cache 204 so that if any session is terminated during the write operation, the SWCU 302 reestablishes the terminated session based on the last session ID stored in the session cache 308. The SWCU 302 also prevents overwriting of the storage device 112 by another session running simultaneously. If any last session ID is available, then the SWCU 302 allows writing operation of the unfinished data of the last session before establishing a new session. The SWCU 302 continuously monitors the one or more sessions that are in progress and maintains at least one session between the storage device 112 and the user or the storage controller 104.

Upon establishing a valid session, the SWCU 302 authenticates the user or the storage controller 104 to perform the write operation. The SWCU 302 retrieves the write access key of the requested user or the storage controller 104 and compares with a predetermined write access key previously assigned to the user or the storage controller 104. The SWCU 302 initially generates a unique write access key to each user and the storage controller 104 and stores the generated access key in the key cache 310 of the dedicated controller cache 204. Once the session is established, the SWCU 302 compares the write access key provided by the user with the predetermined access key stored in the key cache 310 for the respective user or the storage controller 104. If the comparison is successful, the SWCU 302 performs the write operation of the data into the storage device 112, otherwise the write operation is prevented.

At block 408, perform write operation of data into the storage device. In one embodiment, the system 100 writes data into the storage device 112, upon authenticating the storage device 112 and the user or the storage controller 104. In one embodiment, the ECU 306 encrypts the data to be written into the storage device 112 using known encryption techniques. Further, the ECU 306 compresses the encrypted data using known compression techniques. The compressed data is then stored in a predefined memory location in the storage device 112.

Figure 5:
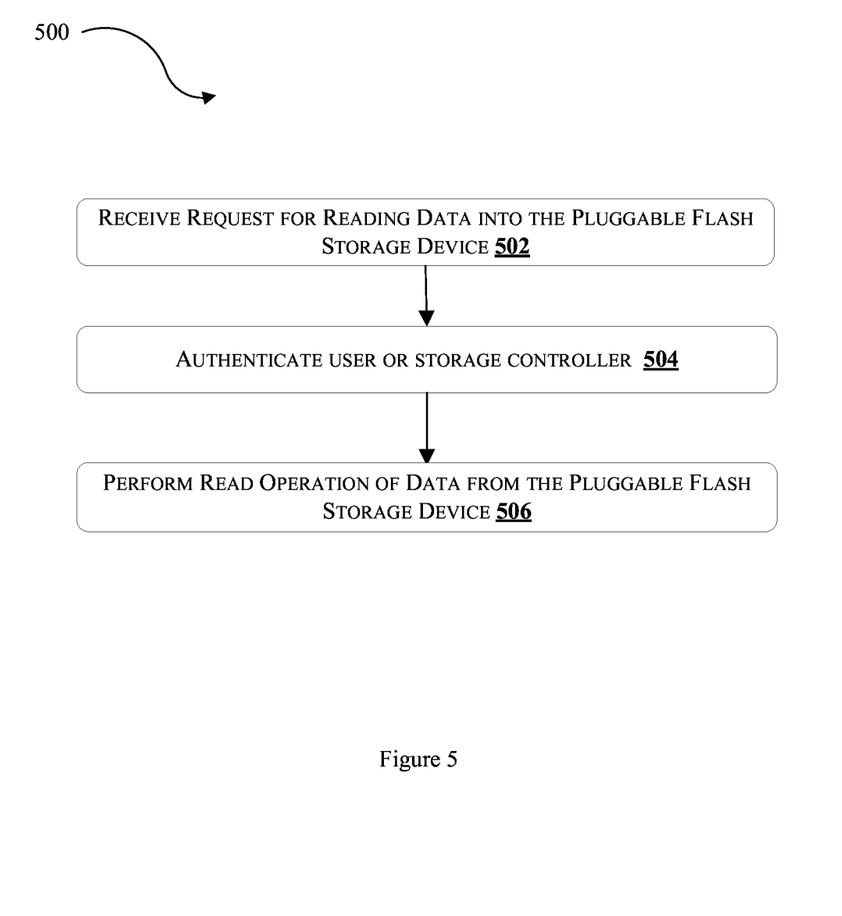
FIG. 5 illustrates a flowchart of an exemplary method of performing read operation from the pluggable flash storage device in accordance with some embodiments of the present disclosure.

FIG. 5 illustrates a flowchart of an exemplary method of performing read operation from the pluggable flash storage device in accordance with some embodiments of the present disclosure.

As illustrated in FIG. 5, the method 500 comprises one or more blocks implemented by the system 200 for performing secure read operation in the storage device 112. The method 500 may be described in the general context of computer executable instructions. Generally, computer executable instructions can include routines, programs, objects, components, data structures, procedures, modules, and functions, which perform particular functions or implement particular abstract data types.

The order in which the method 500 is described is not intended to be construed as a limitation, and any number of the described method blocks can be combined in any order to implement the method 500. Additionally, individual blocks may be deleted from the method 500 without departing from the spirit and scope of the subject matter described herein. Furthermore, the method 500 can be implemented in any suitable hardware, software, firmware, or combination thereof.

At block 502, receive request for writing data into the storage device. In one embodiment, a request for reading data is received by the user IO request queue 102. The user IO request queue 102 forwards the request to the storage controller 104. The data to be read may include metadata, code images, diagnostic data such as core files and log files, and extended diagnostics associated with the storage controller 104.

At block 504, authenticate user or the storage controller. In one embodiment, the SWCU 302 retrieves the read access key of the requested user or the storage controller 104 and compares with a predetermined read access key previously assigned to the user or the storage controller 104. In one embodiment, the SWCU 302 initially generates a unique read access key to each user and the storage controller 104 and stores the generated access key in the key cache 310 of the dedicated controller cache 204. Once the session is established to perform read operation, the SWCU 302 compares the read access key provided by the user with the predetermined access key stored in the key cache 310 for the respective user or the storage controller 104. If the comparison is successful, the SWCU 302 performs the read operation of the data from the storage device 112. If the comparison is unsuccessful, then the read operation requested by an unauthorized user is prevented.

At block 506, perform read operation of data from the storage device. In one embodiment, the ECU 306 extracts the compressed data from the storage device 112, performs decompression of the extracted data using known decompression techniques and decrypts the decompressed data using known decryption techniques to retrieve the raw data.

As described above, the system 200, amongst other things, include routines, programs, objects, components, and data structures, which perform particular tasks or implement particular abstract data types. The system 200 may also be implemented as, signal processor(s), state machine(s), logic circuitries, and/or any other device or component that manipulate signals based on operational instructions. Further, the system 100 can be implemented by one or more hardware components, by computer-readable instructions executed by a processing unit, or by a combination thereof.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., are non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

I claim:

1. A method of performing secure read/write operation in a pluggable flash storage device, said method comprising:
   receiving, from at least one of user and a storage controller, a request for writing into a pluggable flash storage device;
   upon receiving the request for writing data, authenticating the pluggable flash storage device based on a predetermined signature of the pluggable flash storage device;
   determining whether a prior write operation of data to the pluggable flash storage device is complete;
   upon determining the prior write operation is complete:
      authenticating at least one of user and the storage controller by comparing a write access key provided to at least one of user and the storage controller with a predetermined write access key; and
      performing write operation of data in the pluggable flash storage device upon authenticating the pluggable flash storage device and at least one of the user and the storage controller.

2. The method as claimed in claim 1, further comprising:
   wherein determining whether a prior write operation of data to the pluggable flash storage device is complete comprise:
   determining whether a first session ID associated with a prior session is available;
   upon determining that the first session ID is available:
      determining that the prior write operation of data to the pluggable flash storage device is incomplete.

3. The method of claim 2, further comprising:
   upon determining that the first session ID is available:
      reestablishing the prior session;
      performing a write operation of unfinished data of the prior session; and
      establishing a new session after performing the write operation of unfinished data of the prior session;
   upon determining that the first session ID is not available:
      determining that the prior write operation of data to the pluggable flash storage device is complete; and
      establishing the new session;
   wherein the at least one of user and the storage controller is authenticated after the new session is established.

4. The method as claimed in claim 1, wherein the predetermined signature of the pluggable flash storage device is generated by the steps of:
   extracting information associated with the pluggable flash storage device, the information include at least physical serial number, model number, manufacturing identity number and name of manufacturer;
   generating a pseudo number based on the extracted information and storing the generated pseudo number in the predefined memory location of the storage controller;
   processing the pseudo number using hash function to generate a hashed value; and
   encrypting the hashed value into the predetermined signature of the pluggable flash storage device.

5. The method as claimed in claim 1, wherein authenticating the pluggable flash storage device comprises the steps of:
   determining signature of the pluggable flash storage device stored in a predefined memory location of the pluggable flash storage device;

decrypting the determined signature into a hashed value;
generating a pseudo number based on the hashed value;
comparing the generated pseudo number of the pluggable flash storage device with a predetermined pseudo number stored in the predefined memory location of the storage controller; and
authenticating the pluggable flash storage device based on comparison.

6. The method as claimed in claim 1, wherein performing the write operation of data in the pluggable flash storage device comprising the steps of:
encrypting the data to be written in the pluggable flash storage device;
compressing the encrypted data into a compressed data; and
storing the compressed data in the predetermined memory location of the pluggable flash storage device.

7. The method as claimed in claim 1, further comprising:
upon receiving, from at least one of user or the storage controller, a request for reading of data from the pluggable flash storage device;
authenticating at least one of the user and the storage controller by comparing a read access key provided to at least one of user and the storage controller with a predetermined read access key;
upon authenticating, extracting the compressed data from the predefined memory location of the pluggable flash storage device;
decompressing the extracted compressed data to obtain an encrypted data;
decrypting the encrypted data to generate the decrypted data; and
performing read operation of the decrypted data from the pluggable flash storage device.

8. The method as claimed in claim 1, wherein the predetermined write access key is stored in predefined memory location of the storage controller.

9. A system for performing secure read/write operation in a pluggable flash storage device, the system comprising:
a user IO request queue for receiving one or more requests for at least one of reading and writing of data from at least one of user and a storage controller;
the pluggable flash storage device;
an IO engine coupled with the pluggable flash storage device;
the storage controller coupled with the user IO request queue and the IO engine, comprising:
at least a device authentication and data security (DADS) component configured to:
receive, from the user IO request queue, a request for writing data;
upon receiving the request, authenticate the pluggable flash storage device based on a predetermined signature of the pluggable flash storage device;
determining whether a prior write operation of data to the pluggable flash storage device is complete;
upon determining the prior write operation is complete:
authenticate at least one of user and the storage controller by comparing a write access key provided to at least one of user and the storage controller with a predetermined write access key; and
perform write operation of data in the pluggable flash storage device upon authenticating the pluggable flash storage device and at least one of the user and the storage controller.

10. The system as claimed in claim 9, wherein the DADS component further comprises a session and write control unit;
wherein the determination of whether a prior write operation of data to the pluggable flash storage device is complete comprises the session and write control unit being configured to:
determine whether a first session ID associated with a prior session is available;
upon determining that the first session ID is available:
determine that the prior write operation of data to the pluggable flash storage device is incomplete.

11. The system as claimed in claim 9, wherein the DADS component comprises at least a hash key generating and authenticating unit configured to generate the predetermined signature of the pluggable flash storage device by the steps of:
extracting information associated with the pluggable flash storage device, the information include at least physical serial number, model number, manufacturing identity number and name of manufacturer;
generating a pseudo number based on the extracted information and storing the generated pseudo number in the predefined memory location of the storage controller;
processing the pseudo number using hash function to generate a hashed value; and
encrypting the hashed value into the predetermined signature of the pluggable flash storage device.

12. The system as claimed in claim 9, wherein the hash key generating and authenticating unit is configured to authenticate the pluggable flash storage device by the steps of:
determining signature of the pluggable flash storage device stored in a predefined memory location of the pluggable flash storage device;
decrypting the determined signature into a hashed value;
generating a pseudo number based on the hashed value;
comparing the generated pseudo number of the pluggable flash storage device with a predetermined pseudo number stored in the predefined memory location of the storage controller; and
authenticating the pluggable flash storage device based on comparison.

13. The system as claimed in claim 9, wherein the DADS component further comprises an encryption and compression unit configured to perform the write operation of data in the pluggable flash storage device by the steps of:
encrypting the data to be written in the pluggable flash storage device;
compressing the encrypted data into a compressed data; and
storing the compressed data in the predetermined memory location of the pluggable flash storage device.

14. The system as claimed in claim 9, wherein the DADS component is further configured to:
receive, from at least one of user or the storage controller, a request for reading of data from the pluggable flash storage device;
authenticate at least one of the user and the storage controller by comparing a read access key provided to at least one of user and the storage controller with a predetermined read access key;
upon authenticating, extract the compressed data from the predefined memory location of the pluggable flash storage device;

decompress the extracted compressed data to obtain an encrypted data; decrypt the encrypted data to generate the decrypted data; and perform read operation of the decrypted data from the pluggable flash storage device.

15. The system as claimed in claim 9, further comprises a dedicated controller cache coupled with the storage controller, configured to store predetermined write access key, the predetermined read access key, the pseudo number and the last session ID are stored in predefined memory location of the storage controller.

16. A non-transitory computer readable medium including instructions stored thereon that when processed by at least one processor cause a system to perform acts of:
receiving, from at least one of user and a storage controller, a request for writing into a pluggable flash storage device;
upon receiving the request for writing data, authenticating the pluggable flash storage device based on a predetermined signature of the pluggable flash storage device;
determining whether a prior write operation of data to the pluggable flash storage device is complete;
upon determining the prior write operation is complete:
 authenticating at least one of user and the storage controller by comparing a write access key provided to at least one of user and the storage controller with a predetermined write access key; and
 performing write operation of data in the pluggable flash storage device upon authenticating the pluggable flash storage device and at least one of the user and the storage controller.

17. The medium as claimed in claim 16, wherein the instructions, on execution, cause the at least one processor to authenticate the pluggable flash storage device by the steps of:
determining signature of the pluggable flash storage device stored in a predefined memory location of the pluggable flash storage device;
decrypting the determined signature into a hashed value;
generating a pseudo number based on the hashed value;
comparing the generated pseudo number of the pluggable flash storage device with a predetermined pseudo number stored in the predefined memory location of the storage controller; and
authenticating the pluggable flash storage device based on comparison.

18. The medium as claimed in claim 16, wherein the instructions, on execution, further cause the at least one processor to:
determine a last session ID of a last session established between the authenticated pluggable flash storage device and at least one of the user and the storage controller;
upon determining the last session ID, perform write operation of unfinished data of the last session; and
create a new session between the authenticated pluggable flash storage device and at least one of the user and the storage controller based on the last session ID for performing write operation of data in the pluggable flash storage device.

19. The medium as claimed in claim 16, wherein the instructions, on execution, cause the at least one processor to predetermine signature of the pluggable flash storage device by the steps of:
extracting information associated with the pluggable flash storage device, the information include at least physical serial number, model number, manufacturing identity number and name of manufacturer;
generating a pseudo number based on the extracted information and storing the generated pseudo number in the predefined memory location of the storage controller;
processing the pseudo number using hash function to generate a hashed value; and
encrypting the hashed value into the predetermined signature of the pluggable flash storage device.

20. The medium as claimed in claim 16, wherein the instructions, on execution, cause the at least one processor to perform the write operation of data in the pluggable flash storage device by the steps of:
encrypting the data to be written in the pluggable flash storage device;
compressing the encrypted data into a compressed data; and
storing the compressed data in the predetermined memory location of the pluggable flash storage device.

21. The medium as claimed in claim 16, wherein the instructions, on execution, cause the at least one processor to:
receive, from at least one of user or the storage controller, a request for reading of data from the pluggable flash storage device;
authenticate at least one of the user and the storage controller by comparing a read access key provided to at least one of user and the storage controller with a predetermined read access key;
upon authenticating, extract the compressed data from the predefined memory location of the pluggable flash storage device;
decompress the extracted compressed data to obtain an encrypted data;
decrypt the encrypted data to generate the decrypted data; and
perform read operation of the decrypted data from the pluggable flash storage device.

* * * * *

UNITED STATES PATENT AND TRADEMARK OFFICE
CERTIFICATE OF CORRECTION

| | | |
|---|---|---|
| PATENT NO. | : 9,721,122 B2 | Page 1 of 1 |
| APPLICATION NO. | : 14/664005 | |
| DATED | : August 1, 2017 | |
| INVENTOR(S) | : Madhukar Gunjan Chakhaiyar | |

It is certified that error appears in the above-identified patent and that said Letters Patent is hereby corrected as shown below:

Claim 4, Column 10, Line 52, "information include" should read as --information including--.

Claim 6, Column 11, Line 11, "device comprising" should read as --device comprises--.

Claim 9, Column 11, Line 57, "determining whether" should read as --determine whether--.

Claim 11, Column 12, Line 20, "information include" should read as --information including--.

Claim 11, Column 12, Line 26, "using hash function" should read as --using a hash function--.

Claim 15, Column 13, Line 6, "further comprises" should read as --further comprising--.

Claim 19, Column 14, Line 13, "information include" should read as --information including--.

Signed and Sealed this
Tenth Day of October, 2017

Joseph Matal
*Performing the Functions and Duties of the*
*Under Secretary of Commerce for Intellectual Property and*
*Director of the United States Patent and Trademark Office*